(12) United States Patent
Jacot et al.

(10) Patent No.: US 7,037,076 B2
(45) Date of Patent: May 2, 2006

(54) SHAPE MEMORY ALLOY DEVICE AND CONTROL METHOD

(75) Inventors: A. Dean Jacot, Kent, WA (US); Robert T. Ruggeri, Kirkland, WA (US); Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 10/217,351

(22) Filed: Aug. 10, 2002

(65) Prior Publication Data

US 2003/0053912 A1 Mar. 20, 2003

Related U.S. Application Data

(63) Continuation of application No. 09/514,561, filed on Feb. 28, 2000, now Pat. No. 6,499,952, which is a continuation-in-part of application No. 09/032,415, filed on Feb. 28, 1998, now Pat. No. 6,065,934.

(60) Provisional application No. 60/039,660, filed on Feb. 28, 1997.

(51) Int. Cl.
F04D 29/36 (2006.01)

(52) U.S. Cl. .......................... 416/155; 60/527

(58) Field of Classification Search .............. 416/481, 416/153, 155, 23, 24, 39, 140; 244/25 R; 136/201, 203; 60/527, 528, 529
See application file for complete search history.

(56) References Cited

U.S. PATENT DOCUMENTS 4,010,455 A 3/1977 Stange .................. 340/539.27

4,700,541 A 10/1987 Gabriel et al. ................ 60/528

(Continued)

OTHER PUBLICATIONS

Jacot et al., "Shape Memory Alloy Consortium and Demonstration," Update to 6th SPIE Smart Structures and Materials Symposium, Mar. 2000.

(Continued)

Primary Examiner—Edward K. Look
Assistant Examiner—Dwayne J White
(74) Attorney, Agent, or Firm—John C. Hammar

(57) ABSTRACT

A preferred rotary actuator includes an actuator assembly having a torque tube formed of a shape memory alloy (SMA), a superelastic NiTinol return spring associated with the torque tube and adapted to bias the torque tube toward an initial position, and a torque tube heating element, especially a thermoelectric device, for switching the SMA to cause rotation to an object connected to the actuator or to generate a torque upon that object. The torque tube (24) includes a proximal end (32) and a distal end (34). The return spring and torque tube are connected at their ends, with the torque tube being pretwisted while in a martensitic state relative to the spring. Activation of the heating element causes the torque tube to enter an austenitic state in which it returns to its previous untwisted configuration. Removal of heat allows the torque tube to return to a martensitic state, when the return spring retwists the torque tube. A unique locking assembly 22 is used with the preferred actuator assembly. A helicopter blade twist rotation system for a rotorcraft blade 200 having a blade root 202 and a tip 204 includes a SMA rotary actuator 18 located within the blade near the blade root, and a passive torque tube (206) located within the blade and having a proximal end connected to the rotary actuator and a distal end connected to the blade near to the blade tip.

18 Claims, 12 Drawing Sheets

U.S. PATENT DOCUMENTS

| | | | |
|---|---|---|---|
| 4,761,955 A | 8/1988 | Bloch | 60/528 |
| 4,798,051 A | 1/1989 | Foote | 60/527 |
| 4,887,430 A | 12/1989 | Kroll et al. | 60/527 |
| 4,965,545 A | 10/1990 | Johnson | 337/140 |
| 5,127,228 A | 7/1992 | Swenson | 60/527 |
| 5,150,864 A | 9/1992 | Roglin et al. | 244/219 |
| 5,317,875 A | 6/1994 | O'Brien et al. | 60/527 |
| 5,662,294 A | 9/1997 | Maclean et al. | 244/219 |
| 5,804,276 A | 9/1998 | Jacobs et al. | 428/110 |
| 6,272,857 B1 * | 8/2001 | Varma | 60/527 |

OTHER PUBLICATIONS

"*Introduction to Shape Memory Alloys*," material from website, Nov. 1999, pp. 1-2.

Hodgson et al., "*Shape Memory Alloys*," Shape Memory Applications, Inc., Mar. 1999, pp. 1-12.

Clingman et al., "*Shape Memory Alloy Consortium and Demonstration*," AIAA-2000-1790, AIAA, Mar. 2000, p. 1-11.

* cited by examiner

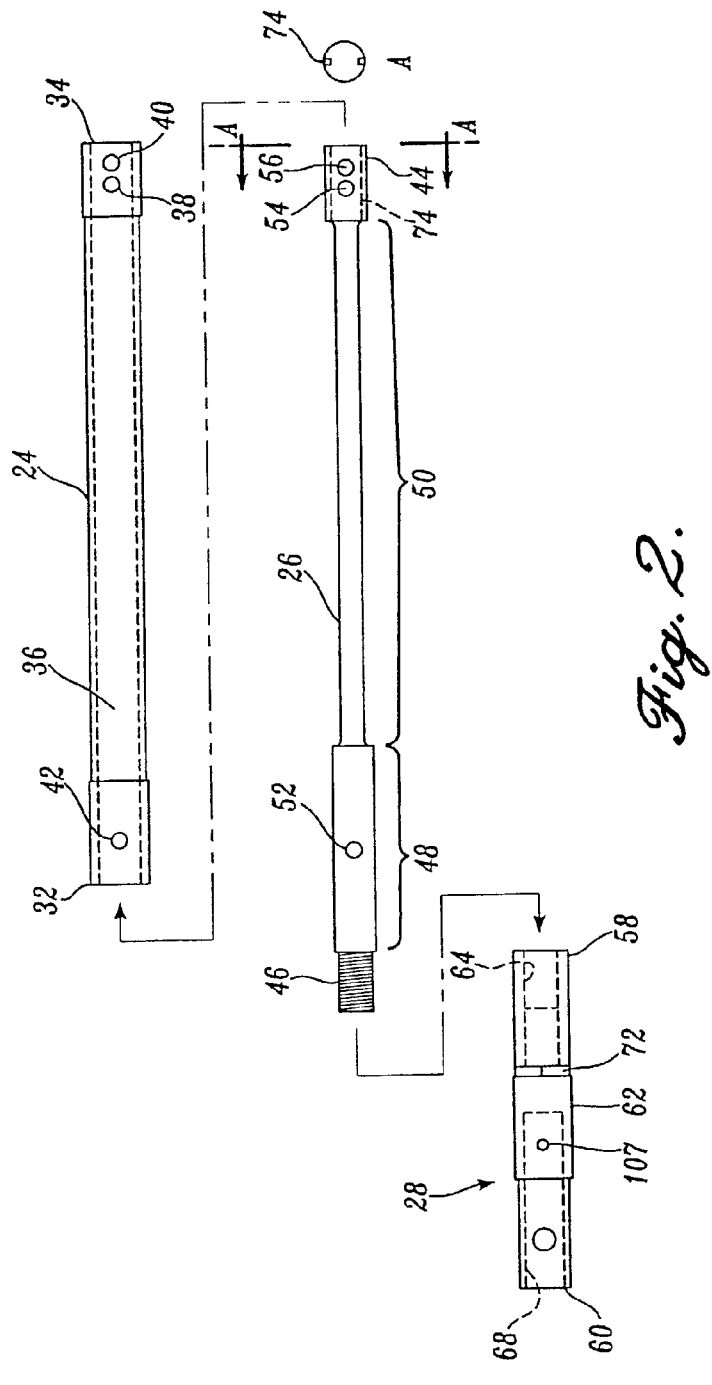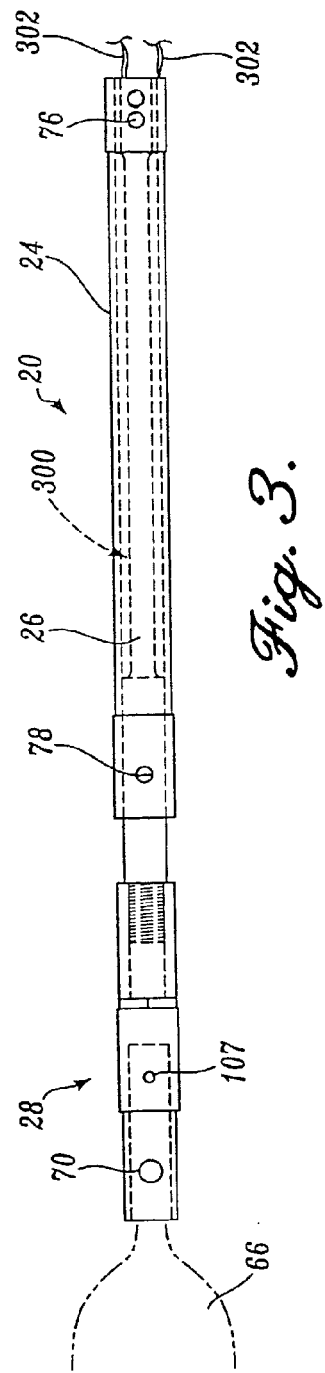
Fig. 2.
Fig. 3.

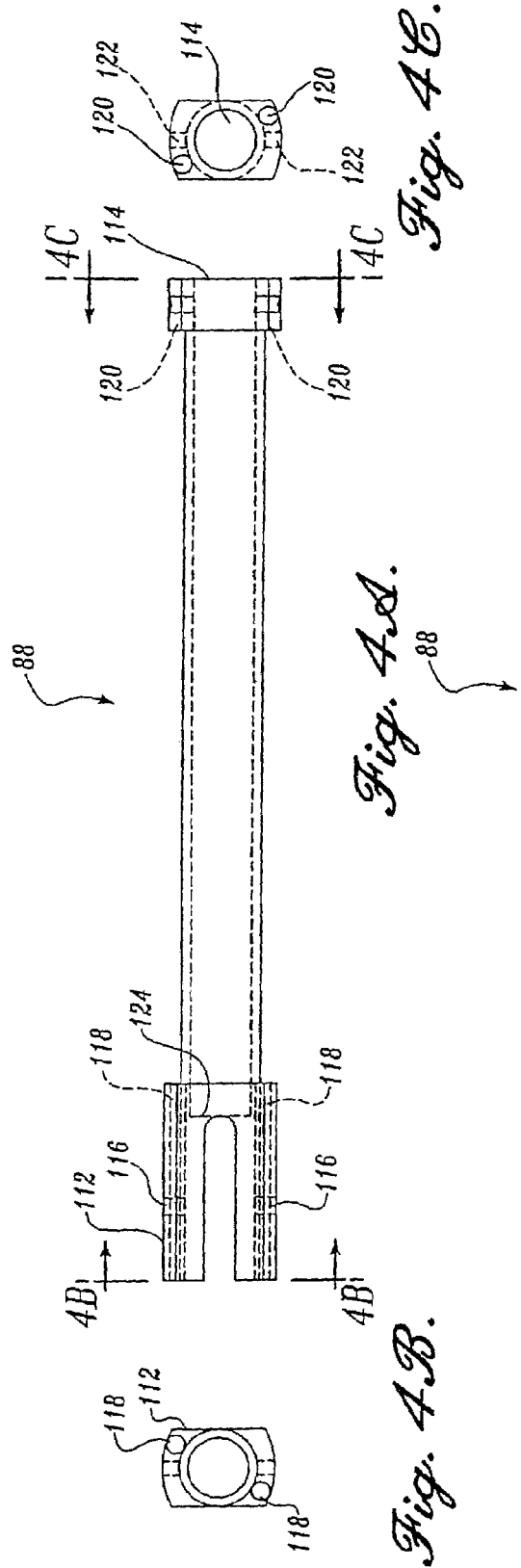

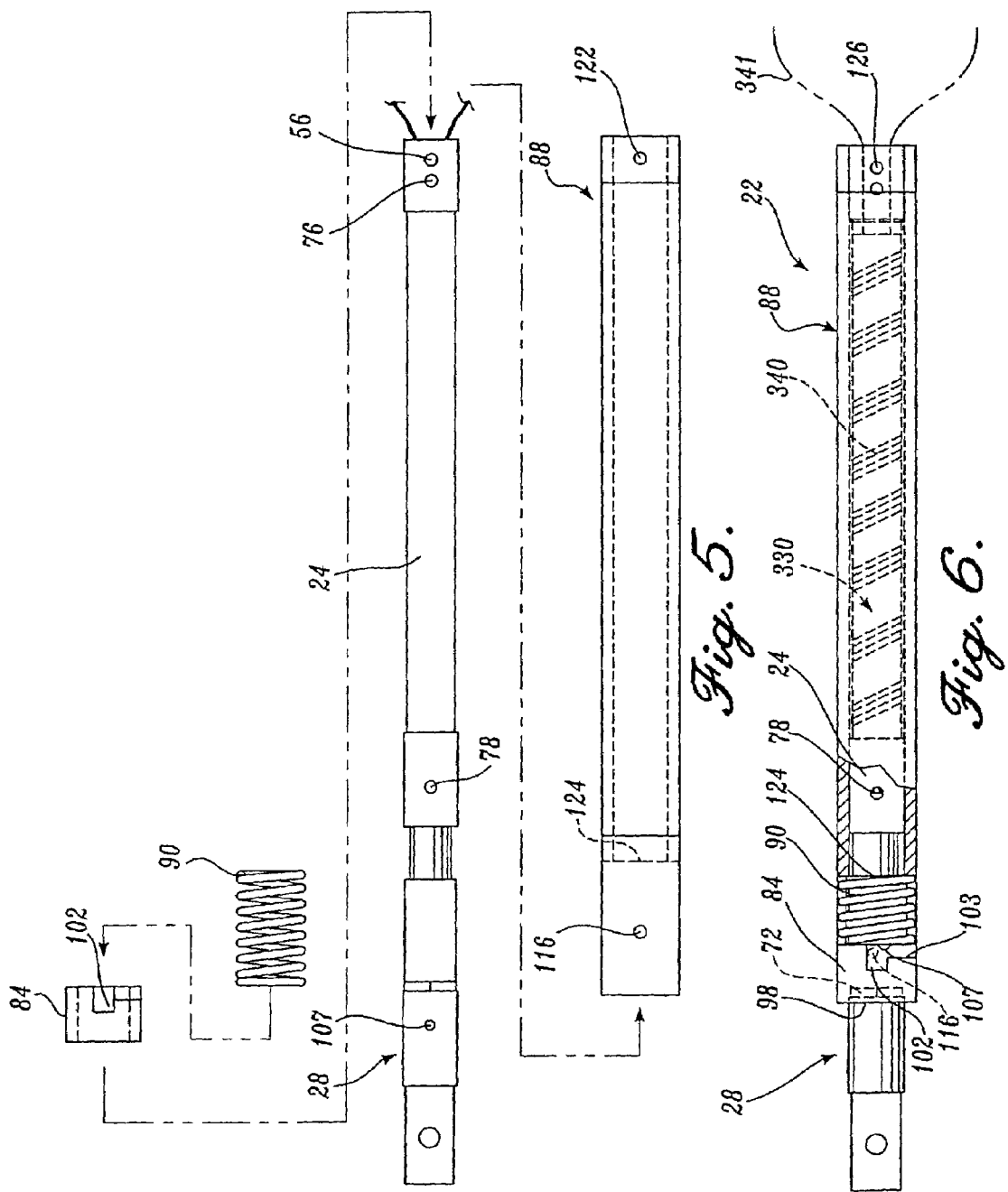

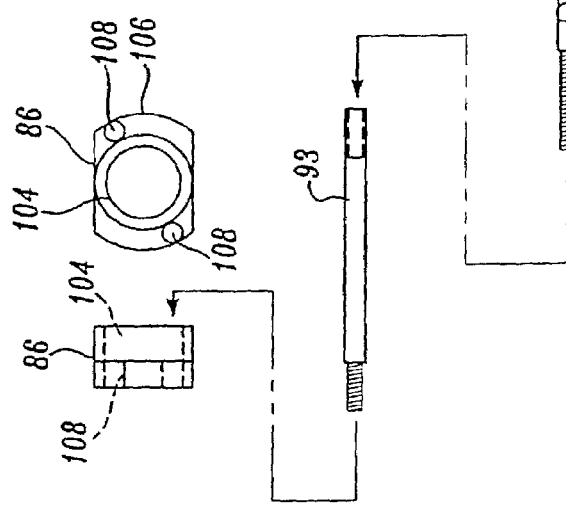
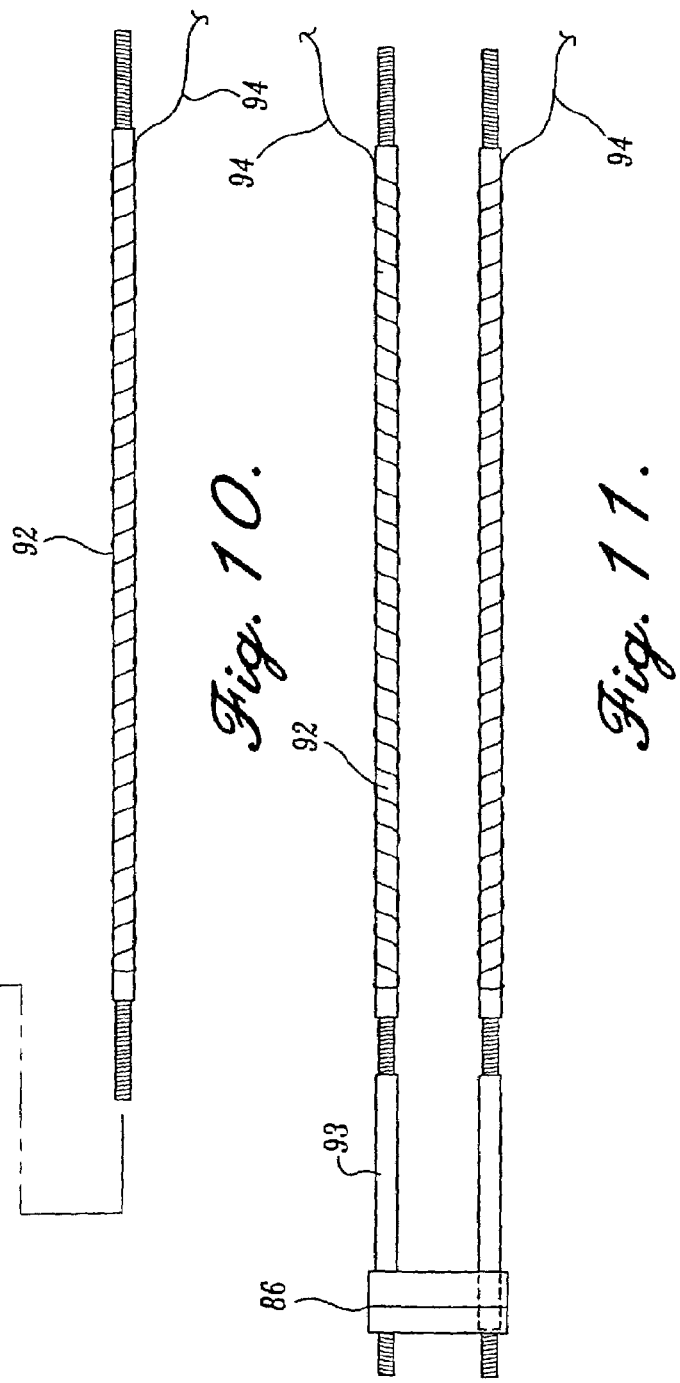

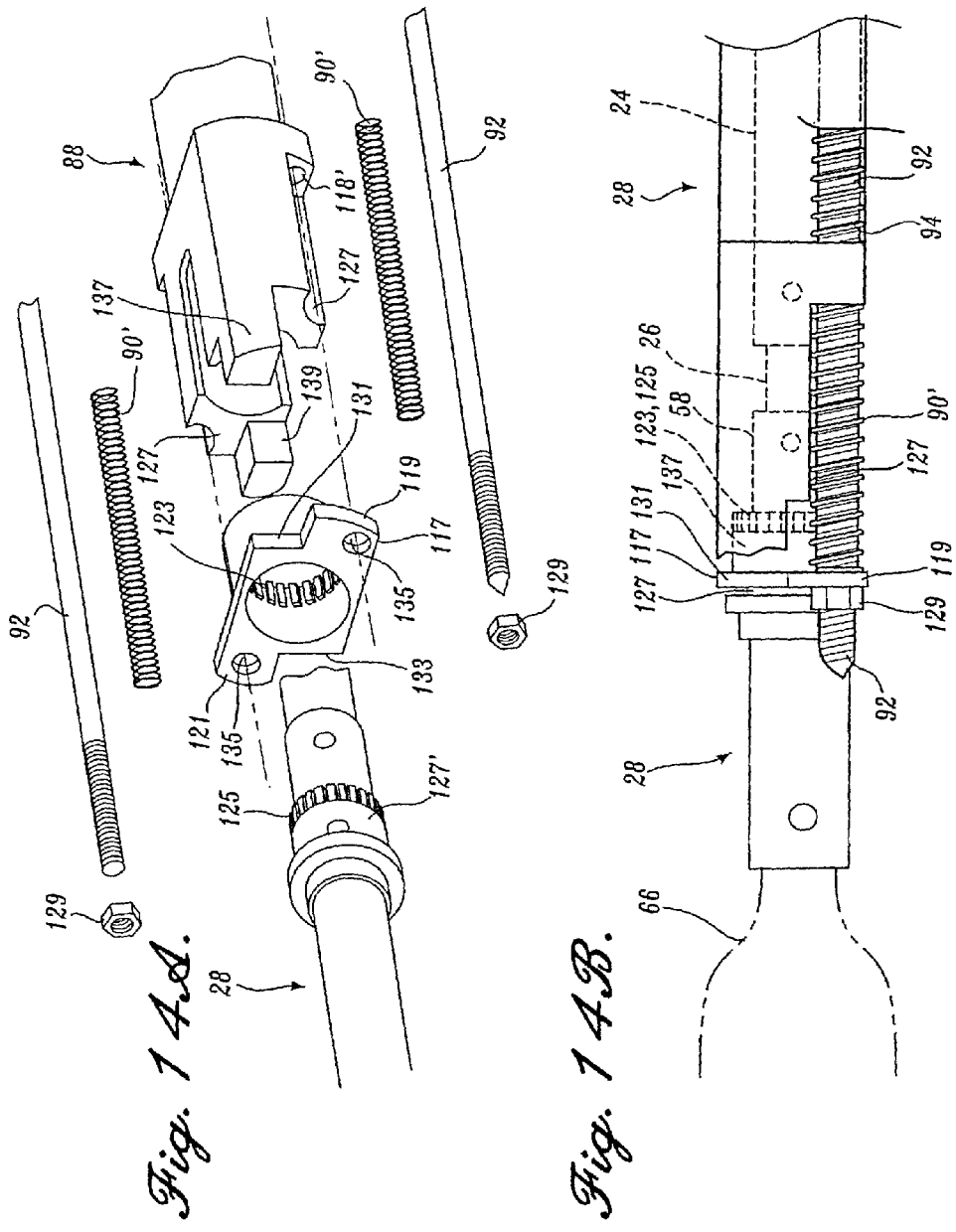

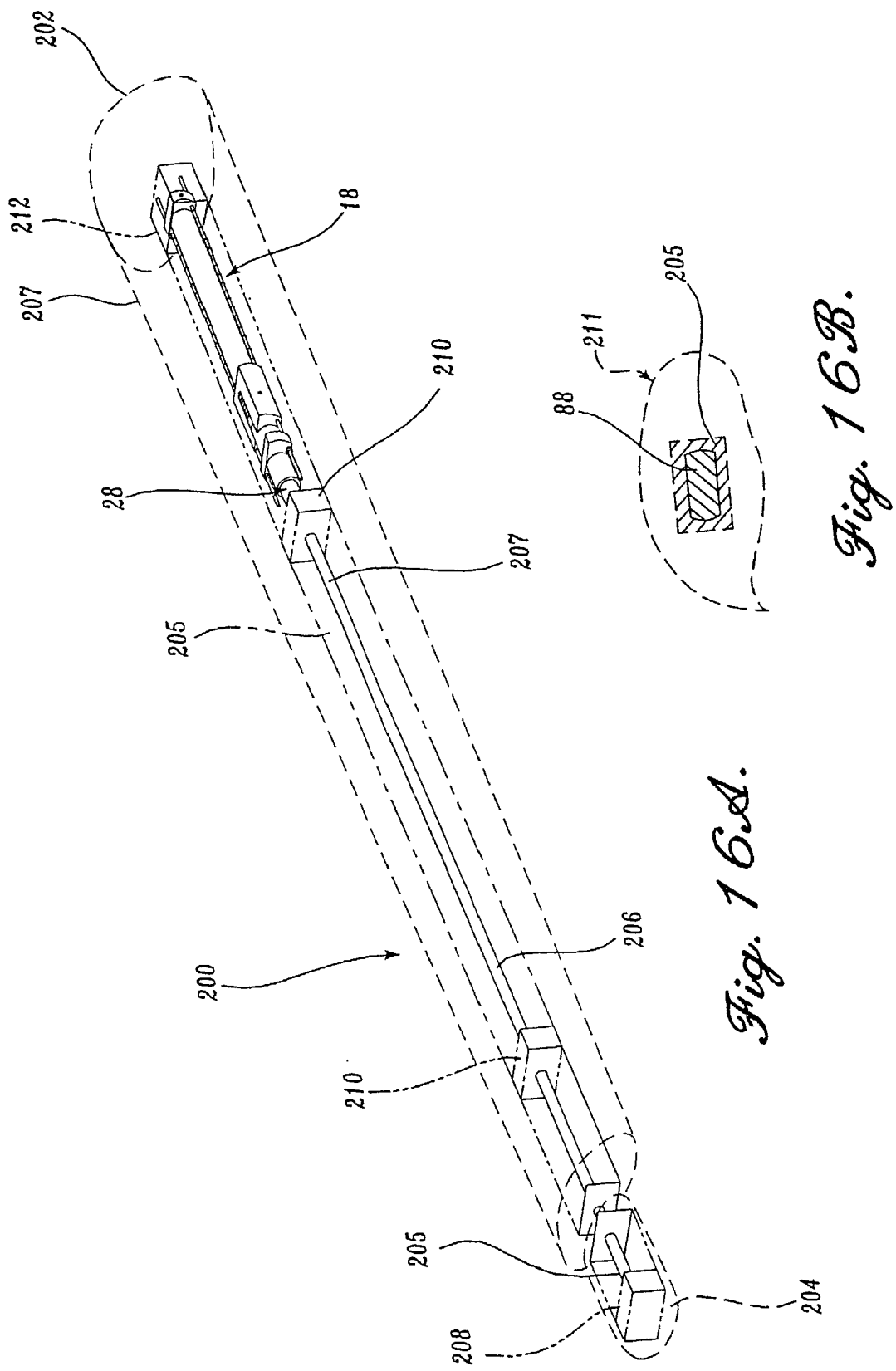

SHAPE MEMORY ALLOY DEVICE AND CONTROL METHOD

REFERENCE TO RELATED APPLICATIONS

This application is a continuation application based upon U.S. patent application Ser. No. 09/514,561 now U.S. Pat. No. 6,499,952, filed Feb. 28, 2000, which was a continuation-in-part application based upon U.S. patent application Ser. No. 09/032,415, filed Feb. 28, 1998, now U.S. Pat. No. 6,065,934, which claims the benefit of U.S. Provisional Application No. 60/039,660, filed Feb. 28, 1997. We incorporate these applications by reference.

NOTICE OF GOVERNMENT INTEREST

The U.S. Government may has an interest in this application under Contract MDA-972-F-30-0017.

TECHNICAL FIELD

The present invention relates to devices using shape memory alloys (SMA), especially SMA rotary actuators for flexing aerospace control surfaces, and to switching mechanisms and methods for controlling the switching of SMAs between states using thermoelectric devices.

BACKGROUND ART

Shape memory alloys (SMA) form a group of metals that have interesting thermal and mechanical properties. If a SMA material such as NiTinol is deformed while in a martensitic state (low yield strength condition) and then heated to its transition temperature to reach an austenitic state, the SMA material will resume its original (undeformed) shape. The rate of return to the original shape depends upon the amount and rate of thermal energy applied to the component. When the SMA material is cooled, it will return to the martensitic state and shape. Properties of and information about shape memory alloys can be found at http://www.sma-inc.com/SMAPaper.html or http://www.SMA-mems.com/info.html, which we also incorporate by reference.

The application of 'smart structures' to helicopter rotors has received widespread study in recent years, and is one thrust of the Shape Memory Alloy Consortium (SMAC) program, which Boeing leads. The SMAC program includes NiTinol fatigue/characterization studies, SMA actuator development, and ferromagnetic SMA material development (offering increased actuation speed). An SMA torsional (i.e. rotary) actuator of the present invention for rotocraft (i.e., helicopters or tilt rotors) retwists a rotocraft blade in flight, and results in a significant payload gain for the vehicle.

Distributed fibers of piezo material embedded in a composite blade can accomplish dynamic twisting. Twists of a degree or two are adequate to achieve dynamic control of vibration and acoustics. By laying the piezo fibers at ±45° to the blade axis and actuating the piezo material along the fiber direction, the piezo strain twists the blade about 2°, either dynamically at control frequencies (for vibration & noise reduction) or statically (for some payload increase). Implementing this technology requires high quality, low cost piezo fibers and high voltage, high power efficient drive amplifiers.

A second method of dynamic control uses a flap, actuated by a piezo stack actuator mounted on the rotor spar. A few degrees of flap motion provide adequate dynamic control of the rotor blade. This method also achieves vibration or acoustic benefits.

One key to getting good response out of an SMA such as NiTinol is to have a good cooling path. The NiTinol needs to be kept as thin as possible, consistent with the load requirements. In one actuator design, we surrounded a NiTinol torque tube with a thin brass tube wrapped with Nichrome foil heater tape. We initially wound the heater tape directly on the torque tube, but discovered that the tape could not stand the large torsion actuation strain the tube undergoes. The axial windings of the tape were nonuniform to help keep the tube at a constant, desired temperature, but the attachments for the tube made it difficult to achieve even, constant heating. The housing carries the heat load from the passive torque tube when the actuator was unpowered. Small air gaps within the actuator impose significant thermal resistance, and grease was required between the NiTinol/brass and heater/housing. The performance measured for the device suggests that 500 watts of power are required for a 20-second response as a nominal value of the power requirement for a ⅙-scale actuator. Scaling laws based upon our tests indicate that simply scaling this design (to full scale) would result in a heavy actuator requiring large power to achieve a constant response time, or, alternatively, would sacrifice response time at reasonable power requirements.

U.S. Pat. No. 5,127,228 describes a 'smart structure' actuator device having an inner SMA (e.g., NiTinol) torque tube seated concentrically within an outer SMA torque tube. Ends of both tubes are mechanically restrained to an indexed position. Because one tube provides torque clockwise while the other tube provides counter-clockwise torque, the tubes are arranged in an opposing manner. Initially, both SMA members are in a martensitic state. A power supply supplies current to heaters that are connected to one of the tubes to control switching of the SMA between memory states. Heating causes rotation of the actuator in a clockwise or counter-clockwise rotational direction, as desired. The electrical energy passing through the heater(s) causes the SMA to which the heater is connected to transition from its martensitic to austenitic state, resulting in the rotation. Control of the electrical power to the heaters allows holding the actuator in a selected rotational position or allows rotation in either rotational direction.

To maintain a specific rotational position in a loaded condition, the '228 device requires continuous electrical power to the heater elements for both SMA tubes. This shortcoming of the '228 device adds significant system weight and complexity and requires excessive power. The '228 device requires the addition of thermal insulation to isolate the tubes thermally or a skillful design so that the heater for one tube does not heat the wrong tube and, thereby, unintentionally create an actuator malfunction.

Other known SMA rotary actuators use a single SMA member to produce the desired reciprocating rotation at desired intervals. These devices use the SMA member to provide rotation in one direction, while using a mechanical spring, a flexure, or another suitable restorative device to provide rotation of the actuator in the return direction. The force achievable with mechanical springs is limited. Large springs having adequate force add considerable weight and mass to the actuator mechanism, which lessens performance and restricts their implementation. The mechanical springs also deteriorate over time, which limits the reliability of the actuator.

A need exists for a SMA rotary actuator to provide any or all of the following properties: (1) controllable torque either in low or high amount, (2) operation in both rotational direction using switching of the state of a single SMA member, locking at a desired rotational position without requiring constant supply of power to heaters associated with the SMA members, or (3) return rotation without applying electrical power. Such a rotary actuator should also be capable of generating a significant torque over a large angle of rotation. A small size and low weight also is beneficial for an improved device. The actuator of the present invention addresses these needs.

SUMMARY OF THE INVENTION

The present invention relates to improved control and operating efficient for a shape memory alloy (SMA) device using a thermoelectric device to pump heat between the SMA and a heat sink. In one preferred embodiment, the SMA device is a rotary actuator (SMA torque tube) and the heat sink is another rotary actuator associated with the first in antagonistic relationship. Such a device is particularly suited for flexing control surfaces in aircraft, particularly a rotocraft blade. Each actuator preferably includes a locking mechanism to allow shutdown of power to the SMA devices.

A preferred rotary actuator of the present invention includes an actuator assembly having a torque tube formed of a shape memory alloy (SMA). A superelastic NiTinol return spring or another SMA torque tube in antagonistic relationship is associated with the torque tube to bias the torque tube toward an initial position. A torque tube heating element, especially a thermoelectric device, transfers heat from the SMA to switch it between states. Such switching causes rotation to an object connected to the actuator or generates a torque upon that object. In a preferred embodiment the torque causes blade twist in a rotocraft blade.

We can increase the payload of a rotocraft by changing the blade twist distribution between hover (where a highly twisted blade is desired) and forward flight (where a less twisted blade is better). The preferred actuator of the present invention uses a SMA because of its high strain capability. The SMA is attached near the root of the rotor. A passive torque tube transfers torque generated by the switching of the SMA between the rotor root and the tip. Multiple stages can be used to implement a nonlinear optimum twist distribution better than current systems. Possible combinations of SMA quasi-static and piezo dynamic control also appear attractive. The development of magnetically activated SMA materials (ferromagnetics) introduces the possibility of both dynamic and quasi-static control without need for hydraulic systems. A payload gain of about 900 pounds is achievable with a twist change in the blade of an order of 8 degrees. Such a twist requires an input torque of about 24,000 inch-pounds for a full-scale blade. A minimum weight system rotates an SMA actuator about 30–60 degrees to wrap up a passive torque tube that is torsionally soft (relative to the blade stiffness). The passive torque tube then transfers the torque to the blade to produce the desired 8 degree twist. This system also reduces the impact of blade torsional dynamics where design must avoid resonances close to any of the harmonics of the spin speed.

A preferred rotary actuator of the present invention rotates or torques an object to which it is attached. The actuator includes a shape memory alloy (SMA) torque tube, a superelastic return spring connected to the torque tube, and a torque tube heater, especially one or more thermoelectric devices, positioned in contact with or near the torque tube to control switching of the SMA between memory states. The torque tube is longitudinally twisted relative to the superelastic return spring. The heater causes the torque tube to enter an austenitic state in which the torque tube returns to an untwisted configuration. Cooling the torque tube causes it to return to a martensitic state, thereby allowing the superelastic return spring to retwist the torque tube to the initial rotational position.

A preferred locking assembly includes a housing, a lock socket having locked and unlocked positions, a spring positioned between the socket and the housing, and at least one SMA actuator rod stretched while in a martensitic state to interconnect between the housing and the lock socket to achieve the desired locking condition. A heating element is associated with the SMA rod to heat the rod to control its switching between states. The torque tube and the superelastic return spring are also usually located within the housing with either the torque tube or the superelastic return spring being connected to the housing. In a first position, the socket cannot be rotated separately relative to the connector. In the other socket position, however, the socket is rotatably disengaged from the connector. The spring continuously urges the socket into its first (locked) position. The actuator rod or rods are trained for memory in length. Activating the heating element causes the rod to shrink. Then, the socket moves to its second position to allow rotation of the connector and the attached superelastic return spring.

A helicopter blade twist rotation system of the present invention twists a helicopter blade having a blade root end, a blade tip end, and a longitudinal spar extending from the blade root end toward the blade tip. The preferred blade twist rotation system connects our SMA rotary actuator to the blade spar near the blade root, and connects a torsionally flexible passive torque tube to the blade spar. The passive torque tube is connected to the rotary actuator and to the blade near to the blade tip. Rotation of the rotary actuator rotates the torque tube with rotation of the proximal end being greater than rotation of the torque tube distal end. Such twisting of the blade can produce a greater than 80% reduction in vibration, a 5–10 dB reduction in BVI acoustic noise while providing the payload increase (about 15% of the rated capacity for the V-22).

BRIEF DESCRIPTION OF THE DRAWINGS

FIG. 2 is an elevation illustrating the connection of components in an actuator assembly formed for use in the embodiment of FIG. 1.

FIG. 3 is an elevation of the combined components of FIG. 2 and one embodiment of a heating element.

FIGS. 4A–4D are top, end, opposite end, and side views of a housing for use in the embodiment of FIG. 1.

FIG. 5 is an elevation illustrating the connection of the actuator assembly of FIG. 2 with a portion of a first embodiment locking assembly formed in accordance with the present invention for use in the actuator embodiment of FIG. 1.

FIG. 6 is an elevation of the combined components of FIG. 5 and a second embodiment of a heating element.

FIG. 10 is an elevation illustrating the linear SMA actuator rods and heating elements in the first embodiment locking assembly.

FIG. 11 is an elevation of the combined components of FIG. 10.

FIGS. 14A and 14B are perspective and side views respectively of an alternative arrangement of a locking assembly formed in accordance with the present invention.

FIGS. 16A and 16B are perceptive and end views respectively of a rotary actuator formed in accordance with the present invention as applied to a rotor blade.

DETAILED DESCRIPTION

Figure 1:
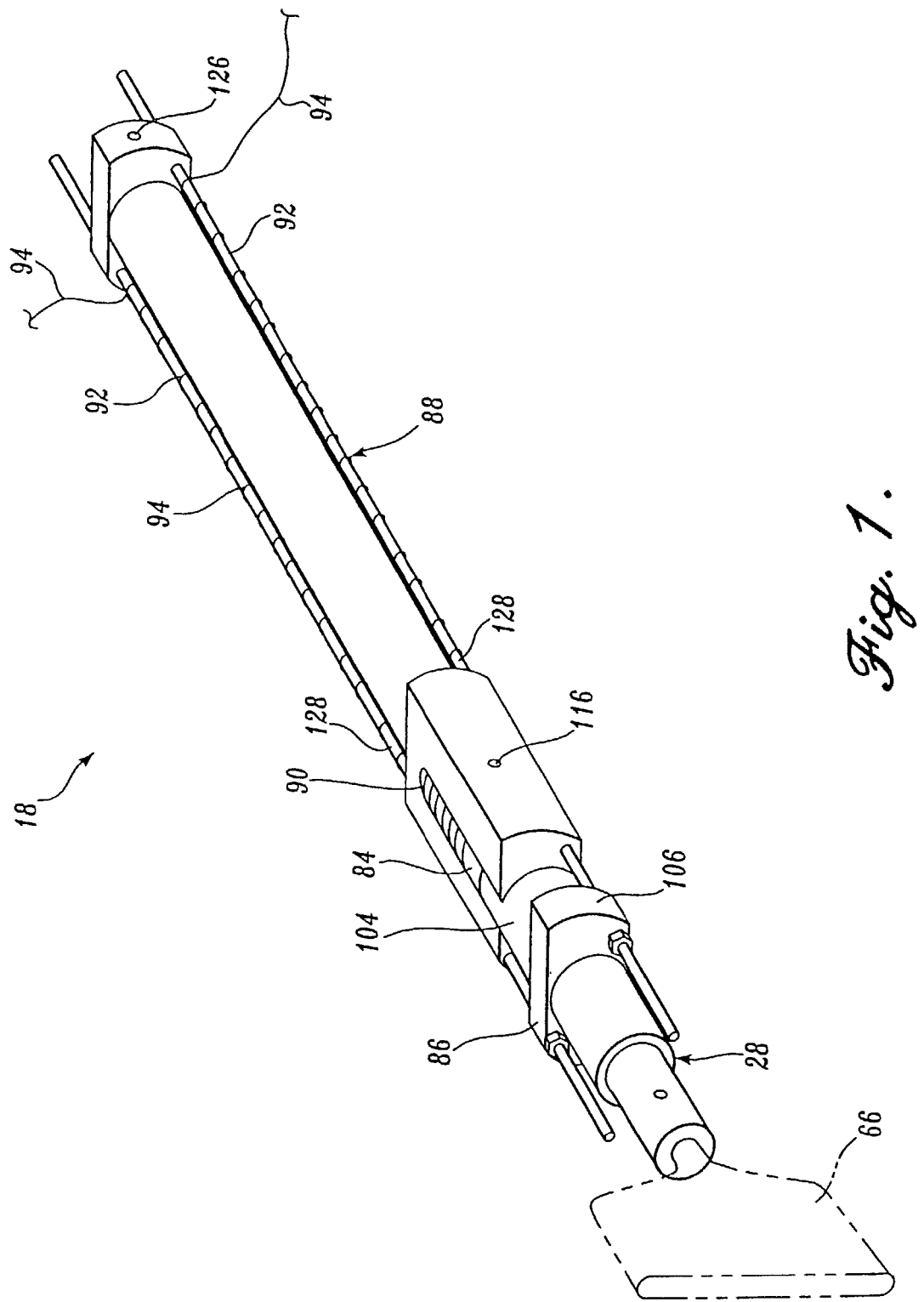
FIG. 1 is a perspective view of one embodiment of a SMA rotary actuator formed in accordance with the present invention.

The present invention is primarily described with reference to a preferred SMA rotary actuator. The concept of controlling the SMA device with a thermoelectric device is braodly applicable to a host of SMA device applications. Operation of the actuator is achieved with a switchable SMA member that is prestrained in one position. Mechanical rotational force is provided by the SMA member to an object when thermal energy is applied to the SMA member to the point where the SMA material changes from the martensitic condition to the austenitic condition. The speed of rotation is controlled by the rate and amount of heat applied to the SMA member. Rotational position is monitored by a sensor and a desired position is held by a locking mechanism. When rotation in the opposite direction is required, the lock is disengaged and a superelastic SMA return spring provides the mechanical force required to rotate the SMA member (and hence the output of the device) back to the neutral position.

A rotary actuator 18 formed in accordance with the present invention includes an actuator assembly 20 and preferably a locking assembly 22. The actuator assembly provides torque between two objects. The actuator assembly includes a SMA torque tube 24 and a torsional superelastic return spring 26. The torque tube 24 is twisted while in a martensitic state and then attached at both ends to the spring 26 using mating pin and pin-hole pairs. The spring 26 is composed of a nickel-titanium (NiTinol) SMA whose composition and processing is such as to enhance superelastic properties. The preferred SMA provides a high energy spring at actuator operating temperatures. In the superelastic form, the material does not exhibit shape memory properties during normal use. Heating the SMA torque tube 24 causes the tube to return to its memory (pretwisted) shape, thereby causing angular rotation in one direction. Rotation occurs because the strength of the austenitic torque tube is greater than the resisting strength of the superelastic return spring.

After discontinuing the application of heat, the torque tube cools and returns to its martensitic state. The spring 26 rotates the actuator assembly in the opposite direction, thus causing the tube 24 to return to its previous twisted state. The locking assembly 22 is provided to keep the actuator assembly 20 in a desired angular orientation without having to apply heat continuously. This type of actuator is suited for use in rotocraft blades, wind turbines, propellers, control surfaces for airplane wings, fan blades, and the like.

Figure 12:
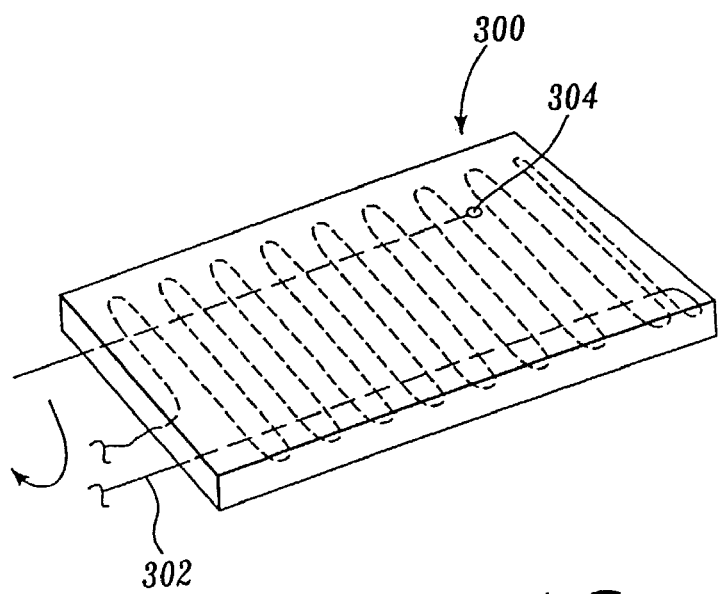
FIG. 12 is a perspective view of one embodiment of a heating element formed in accordance with the present invention.
Figure 15A:
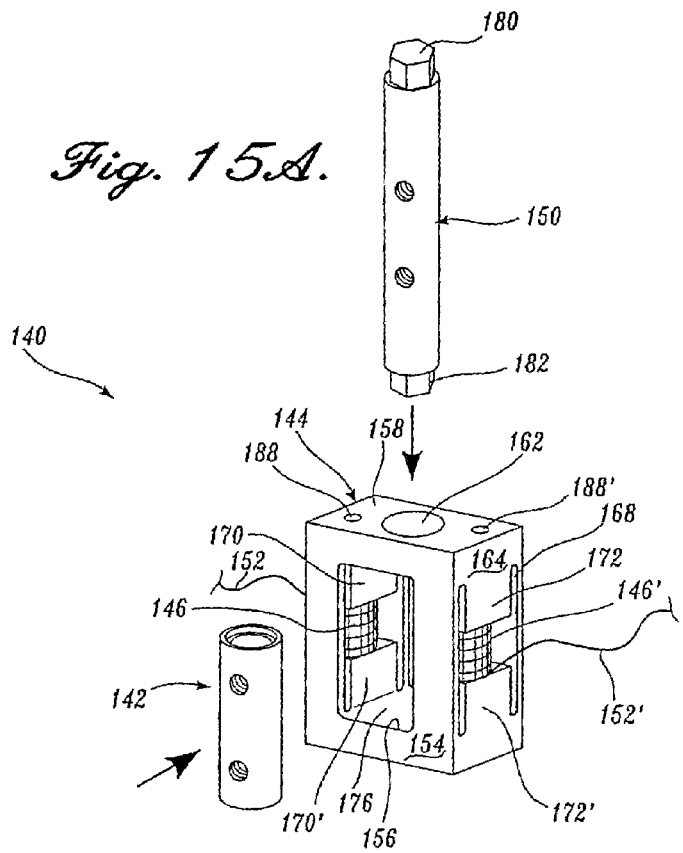
FIGS. 15A and 15B are exploded perspective and side views of a second embodiment of a locking assembly formed in accordance with present invention.
Figure 15B:
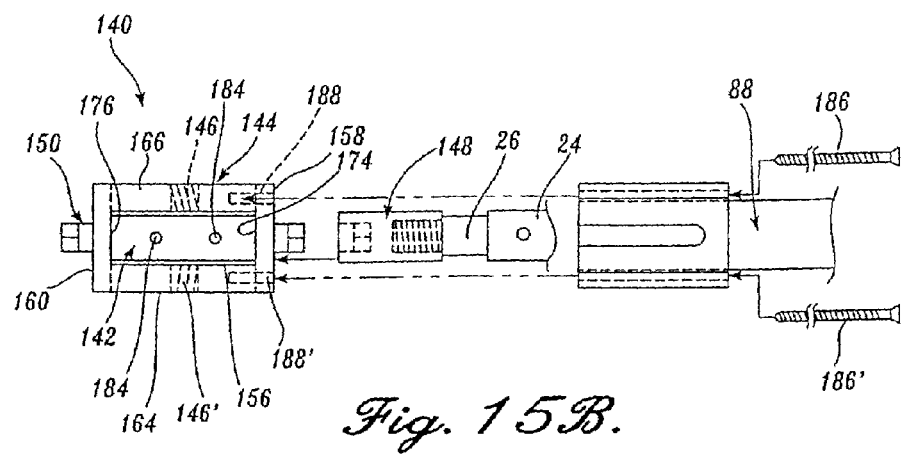
Figure 17:
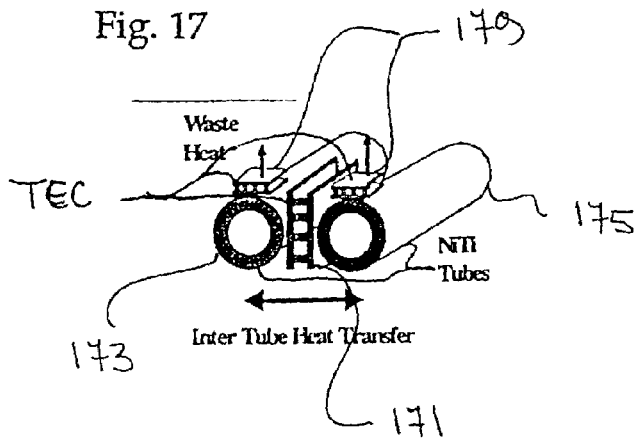
FIG. 17 shows a rotary actuator of the present invention using thermoelectric devices (TECs) to control switching of antagonistic torque tube assemblies and to pass waste heat from the torque tubes to a heat sink.
Figure 18:
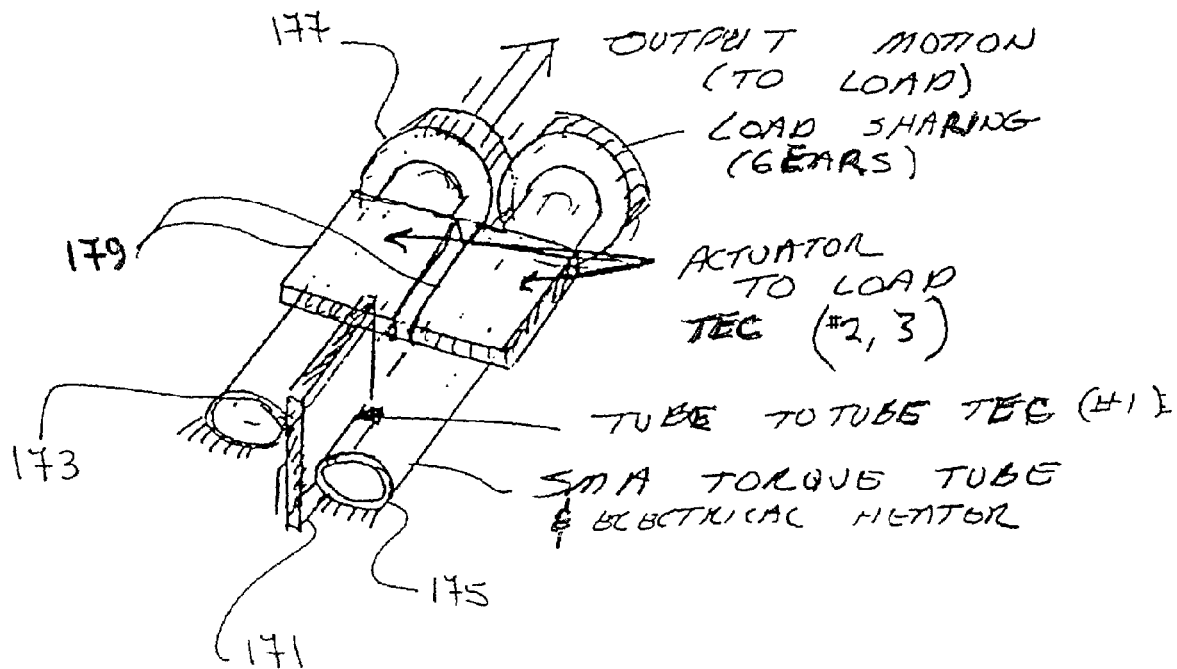
FIG. 18 shows schematically arrangement of three TECs in a preferred actuator of the type shown in FIG. 17.
Figure 19:
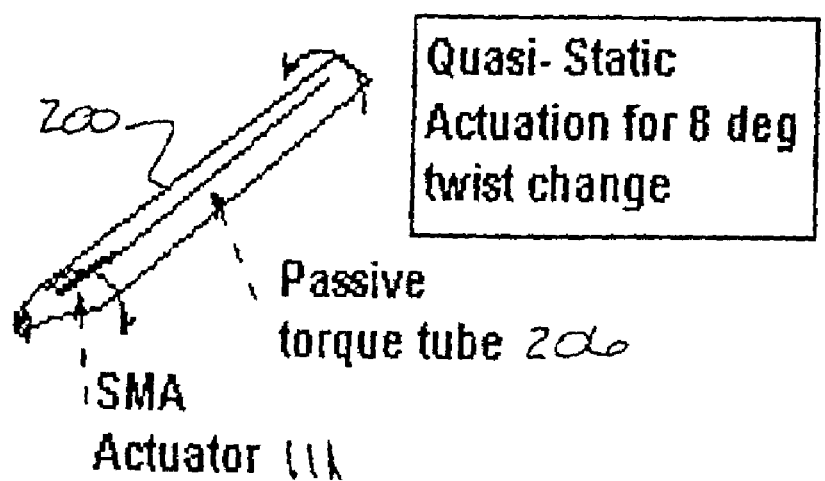
FIG. 19 is a perspective view of a preferred blade twist system of the present invention.

FIGS. 1–11 describe a first, preferred embodiment of a rotary actuator of the present invention. FIGS. 12 and 13 illustrate alternative embodiments for a heating element used in the rotary actuator. FIGS. 14A and 14B illustrate alternative locking assembly arrangements. FIGS. 15A and 15B illustrates another locking assembly. FIGS. 16A and 16B illustrate an actuator that allows a rotocraft blade to be twisted during flight to enhance rotocraft performance. FIGS. 17 and 18 illustrate an embodiment using thermoelectric devices to pump heat between the SMAs or between an SMA and a heat sink. FIG. 19 illustrates a preferred application for the rotary actuator, namely blade twist for a rotocraft blade.

Referring to FIGS. 2 and 3, the actuator assembly 20 includes the torque tube 24, the spring 26, a connector 28, and a heating element 30 for the torque tube (FIGS. 12 and 13.) The combination of the torque tube 24 and superelastic return spring 26 provides the actuator rotation. The connector 28 connects the torque tube 24 to the locking assembly 22 and also connects the assembly to an object to be rotated 66.

In FIG. 2, the SMA torque tube 24 is shaped as a cylinder having a proximal end 32, a distal end 34, and an intermediate portion 36. The ends 32, 34 are preferably structurally reinforced to provide sufficient integrity during connection with the superelastic return spring 26. First and second retaining holes 38, 40 extend through the distal end 34. Each hole is formed in an orientation transverse to the torque tube longitudinal centerline. The proximal end 32 includes a first retaining hole 42 formed in a like manner.

The dimensions of the torque tube 24 will vary according to the design requirements of a particular application. In general, the torque tube inner and outer diameters influence the amount of torque available from the actuator and should be selected accordingly. The tube 24 is formed of a shape memory alloy, e.g., 55-NiTinol or the like. Since the torque tube 24 will be repeatedly switched between its martensitic and austenitic states, it is important to select an alloy having a transition temperature that is appropriate for that application. Prior to assembly, the torque tube must undergo torsion strain and recovery cycling to be trained in memory.

The superelastic return spring 26 is preferably shaped as a rod having a distal end 44, a proximal end 46, a tube-connection portion 48 located near the proximal end 46, and an intermediate portion 50 extending between the tube-connection portion 48 and the proximal end 46. The tube-connection portion 48 includes a retaining hole 52 oriented transverse to the torque tube longitudinal centerline. The distal end 44 includes first and second retaining holes 54, 56 formed in a like manner.

The tube-connection portion 48 and distal end 44 shown in FIG. 2 have a diameter that is larger than the intermediate portion 50 diameter. The spring 26 may alternatively be formed having a single diameter. Similar to the torque tube 24, the superelastic return spring ends 44, 46 are structurally sufficient to provide a sure connection with the torque tube 24. The specific dimensions of the torque tube 24 spring 26 will depend on the to the design requirements of a particular application, e.g., the torsional loading requirements, the angle of rotation, etc.

Figure 9:
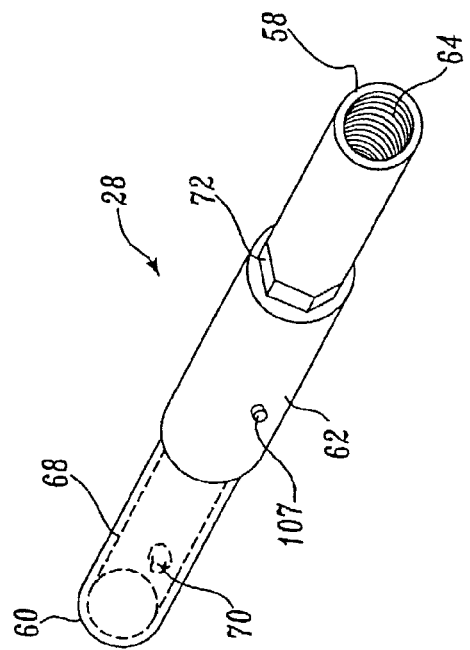

As shown in FIGS. 2 and 9, the preferred connector 28 is a relatively short tubular member having a first end 58, a second end 60, and a middle portion 62. The connector first end 58 is connected to the proximal end 46 of the superelastic return spring. Shown best in FIG. 2, the connection is formed by screwing the return spring proximal end 46 into a threaded longitudinal bore 64 located in the connector first end 58. A preferred method of threading is described in U.S. patent application Ser. No. 08/349,872 titled, "Threaded Load Transferring Attachment" filed Dec. 6, 1994. The connector second end 60 connects the actuator with an object 66 (shown in phantom in FIGS. 1 and 3) to be rotated. A novel arrangement for using the rotary actuator is shown and described with reference to FIGS. 16A and 16B.

A preferred connector includes a longitudinal hole 68 formed in the connector second end 60. A portion of the object 66 is inserted into the hole and is secured using a retaining pin 70. The object 66, the connector 28, and the torque tube 24 are aligned longitudinally so that rotation of the tube causes like rotation of the connector and the object.

As shown in FIGS. 2 and 9, the connector middle portion 62 has a slightly larger diameter than the connector ends 58, 60. A thin hex-shaped surface 72 is formed in the middle portion along its edge closest to the connector first end 58. Portions of the locking assembly 22 engage the hex surface 72. Other arrangements are possible, depending on the locking assembly used.

FIG. 12 shows one embodiment (labeled 300) of a resistive heating element 30 for the torque tube. The heating element 300 includes six, stacked layers (from bottom to top): a conductive copper or aluminum tape, Kapton tape, Nicrome foil, Kapton tape, a heater wire 302 and temperature sensor 304 (i.e., a thermocouple), and, finally, Kapton tape. The combination is formed flat (FIG. 12), and rolled longitudinally to form a tube. Referring to FIG. 3, the tube is positioned between the SMA torque tube 24 and the spring 26, preferably contacting the interior surface of the SMA torque tube 24. The layers are sized so that they will fit appropriately and such that the requisite amount of heat is available at the torque tube to cause the torque tube to enter its austenitic state, when the heating element is activated.

To improve the heating and cooling of the torque tube 24, a second heating element (not shown) may be wrapped on the exterior surface of the torque tube. If a housing encloses the torque tube, the second heating element may be positioned within the housing adjacent the outside of the torque tube. If used, the second heating element is formed in a similar manner to the first, but generally with an additional layer of Kapton tape added to the underside surface (i.e., to the interior surface of the rolled element.)

Figure 13A:
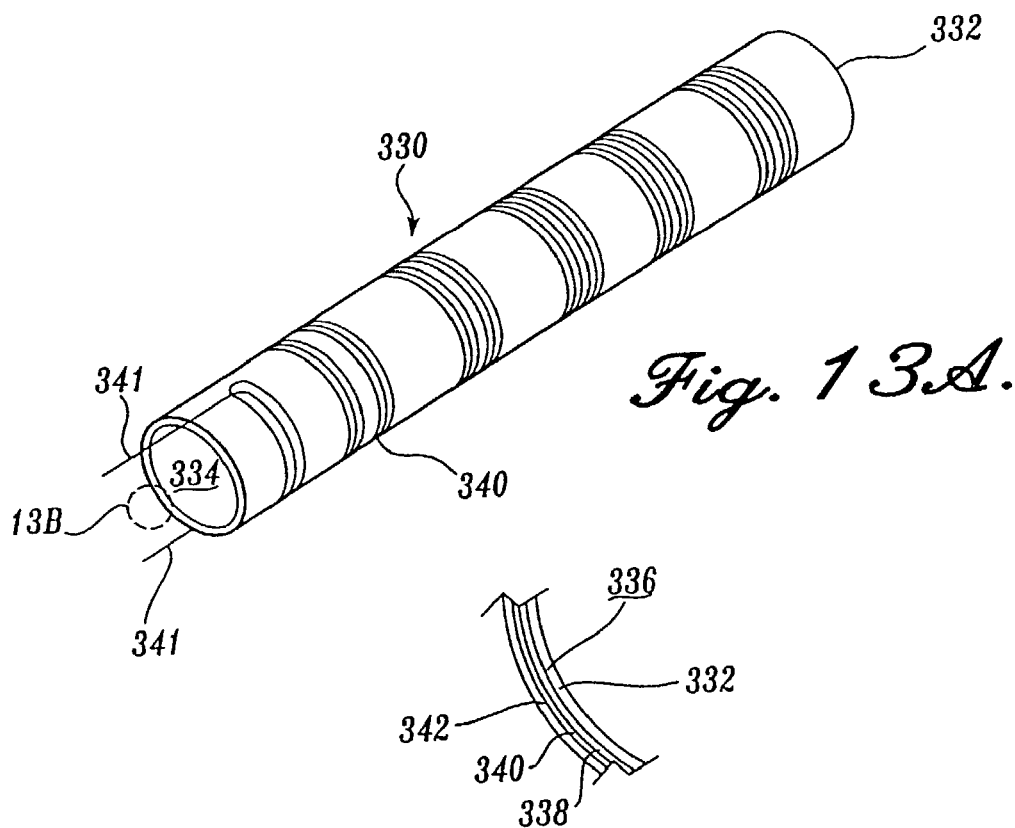
FIG. 13A is a perspective view of a second embodiment of a heating element formed in accordance with the present invention.
Figure 13B:
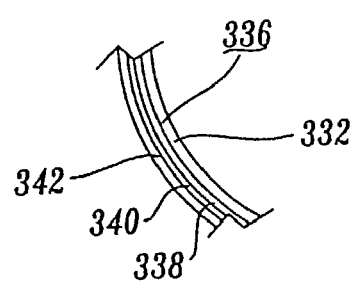
FIG. 13B is a detail view of a portion labeled 13B in FIG. 13A.

FIGS. 13A and 13B show a second embodiment (labeled 330) of a resistive heating element 30 that we prefer to use when we have a thermally conductive housing surrounding the torque tube 24. The heating element 330 includes a tubular structure 332 having interior and exterior surfaces 334, 336. A first thin layer 338 of electrically insulating material is placed on the exterior structure surface 336. Heating foil 340 (such as Nichrome ribbon) is wound about the first layer 338. A second thin layer 342 of electrically insulating material is then placed on the heating foil 340. The heating foil 340 includes wire leads 341 adapted to connect to a power source (not shown.) This embodiment is shown in FIG. 6. The heating foil 340 is wrapped as a pair to allow both leads to terminate on one end of the structure 332.

Still referring to FIG. 6, the heating element 330 is positioned between the SMA torque tube 24 and the housing, and is in thermal contact with both. The structure 332 is attached to the housing, generally with thermal epoxy, to keep it from rotating. Gaps between the torque tube 24 and heating element 330 are filled with thermal grease to improve thermal conductivity between the two. The grease also allows the tubular structure to function as a bearing to hold the SMA torque tube.

The tubular structure 332 is formed from a heat conductive material, e.g., brass, copper, aluminum, steel, Inconel, titanium, silver, gold, etc. The structure walls are formed of a thickness sufficient to provide even heat distribution. The first and second thin layers 338, 342 are also formed from a thermally conductive material, though, significantly less thick than the tubular structure, and, preferably, thermally conductive epoxy due to the ease at which it may be applied. The first layer is thinner (or, more specifically, less thermally resistive) than the second layer so that during heating, more heat will flow toward the SMA torque tube than to the housing. The second layer should still be sufficiently thermally conductive to promote rapid heat transfer to the housing. In this regard, a design compromise must be made between the desired response time and power required to heat the torque tube 24 versus the time needed to cool the tube to affect its transition back to the martensitic state.

When power is supplied to the heating element, heat flows from the heating element 300 or 330 to the torque tube 24. With the current off, the heating element 330 conducts heat from the torque tube 24 to the housing 88, which acts as a heat sink for the actuator. Conductive heat transfer to the housing improves response time.

If heating element 300 is used, the actuator assembly 20 is assembled by placing the element 300 (FIG. 3) concentrically around the intermediate portion 50 of the return spring 26 (FIG. 2). The combination is inserted into the interior of the torque tube 24. The power leads 302 of the heating element 300 pass through one or more longitudinal slots 74 formed in the outer surface of the distal end 44 of the return spring and are connected to a power source (not shown). The torque tube 24 and return spring 26 are secured to each other by placing a retaining pin 76 through aligned holes 38, 54 on the torque tube and return spring.

If heating element 330 (FIG. 5) is used, the tubular structure 332 is attached to the housing. The return spring 26 is inserted into the interior of the torque tube 24. The torque tube 24 and return spring 26 are secured to each other by placing a retaining pin 76 through aligned holes 38, 54.

For either heating element embodiment, the torque tube 24 in a martensitic state is rotated a desired amount relative to the return spring 26. A second retaining pin 78 is inserted through aligned holes 42 and 52 in the proximal ends of the torque tube and return spring. The twisted (biased) torque tube and untwisted return spring are slip fit into the housing 88 or housing/heating element 330. When using element 330, the gap between the torque tube 24 and element 330 is filled with thermal grease.

When the heating element 300 or 330 is activated, heating causes the torque tube to change to its austenitic state, and, in doing so, to return to its pre-strained (or untwisted) configuration. Rotation of the torque tube 24 during this transition of the SMA causes the return spring 26 to rotate when the torque tube 24 cools and converts back to the martensitic state, the return spring forces the torque tube back to its untwisted configuration.

A superelastic return spring provides the advantage of maintaining a generally constant force over the actuation stroke and provides a high energy density relative to other choices for springs. The actuation (retwisting) is automatic and passive.

A locking assembly of the present invention includes a socket 84 (FIGS. 7, 10, 11), a yoke 86 (FIGS. 1, 8), a housing 88 (FIG. 6), a compression spring 90 (FIGS. 5, 6), a pair of linear SMA actuator rods 92 (FIGS. 1, 10, 11), and a pair of rod heating elements 94 (FIGS. 10, 11.) Various alternative embodiments of these locking components are illustrated in FIGS. 14A and 14B. A second embodiment of a locking assembly formed in accordance with the present invention is shown in FIGS. 15A and 15B.

Figure 7:
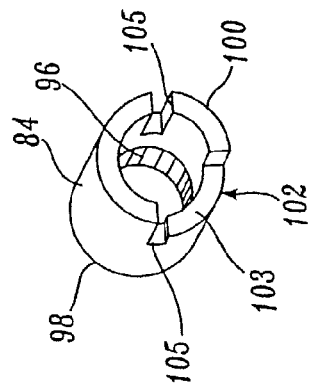
FIGS. 7, 8, and 9 are perspective views of various first embodiment locking assembly components.

Referring to FIG. 7, the socket 84 preferably includes a tubular body with a 12-point female socket interior surface 96 at a first end 98 that is sized to mate with the connector hex surface 72. The socket 84 further includes a second end 100 having various cutouts 102 formed along the second end edge. The cutout 102 of FIG. 7 includes two opposed longitudinal sections 105 to stop the socket from rotating. As shown in FIGS. 6 and 9, the cutout 102 may optionally include an arcuate portion 103 to support a rotation stop pin 107 during actuator rotation and to bound the rotation of the connector between the arcuate portion's starting and ending locations. The rotation stop pin 107 extends radially outward a short distance from the connector niddle portion 62 outer surface and is positioned to engage the cutouts 102.

Figure 8:
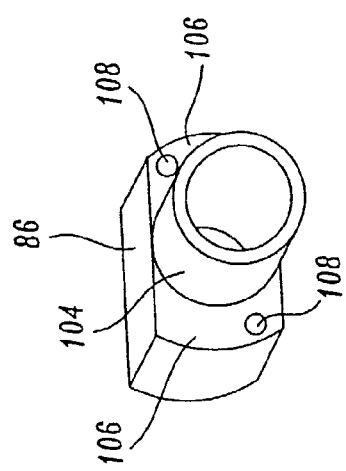

Referring to FIG. 8, the yoke 86 includes a tubular pushing portion 104 and radial side extensions 106. The side extensions have longitudinal holes 108 for connecting with the linear SMA actuator rods 92. In FIGS. 1, 4A–4D, and 5, the housing 88 provides the structural means for supporting the yoke 86. The housing 88 is shaped as a tubular metal member having a distal end 114 and a forked proximal end 112. The forked proximal end 112 includes a pair of short guide pins 116 located radially inward through in each fork tine to the housing inner diameter. The forked proximal end 112 also includes a pair of longitudinal side holes 118.

The distal end 114 of housing 88 also includes radial side extensions with longitudinal holes 120 for alignment with the longitudinal holes 118 in the proximal end. The distal end 114 further includes a single transverse hole 122 for connection and locking the housing 88 to the torque tube and the return spring with the retaining pin. The inner diameter of the housing is stepped radially outward at a location 124 near the forked proximal end 112. The inner housing diameter between the step 124 and the distal end 114 is sized to closely fit the outer diameter of the torque tube 24. The inner housing diameter between the step 124 and the proximal end 112 is sized to closely fit the outer diameter of the compression spring 90, the socket 84, and the yoke pushing portion 104. FIG. 1.

Referring to FIGS. 10 and 11, the linear SMA actuator rods 92 are trained for memory in length and for enhanced two-way memory. In the initial condition, the rods 92 are martensitic and are stretched in length. Upon application of heat, the rods 92 transition into their austenitic state, thus returning to their unstrained (pre-stretched) memory shape. The SMA actuator rod heating elements 94 are preferably Nicrome wire wrapped about the linear SMA actuator rods 92, as shown in FIGS. 1, 10, and 11.

Additional components may be provided as necessary. For example, various sensors may be inserted between the return spring 26 and the torque tube 24 for use in monitoring and controlling the performance of the actuator assembly, e.g., a strain gauge, potentiometers, differential reluctance transducers, thermocouples, etc.

The connection of the yoke 86, socket 84, housing 88, and actuator assembly is shown in FIG. 6. The socket 84 is placed on the connector so that the female socket surface 96 engages the connector hex surface 72. Next, the compression spring 90 is placed around the actuator assembly adjacent the unengaged socket second end. This combination is placed in the housing 88 and the holes 40, 56 are aligned with the housing hole 122. A retaining pin 126 is secured within the aligned holes. In connecting the actuator assembly with the housing 88, the compression spring 90 is forced to compress between the housing inner diameter step 124 and the socket 84, with the socket 84 itself being butted about the connector hex surface. In this manner, the actuator is locked. The torque tube 24 will not rotate even if heated, without first unlocking the locking assembly 22.

Continuing with the assembly of the locking assembly 22 and referring to FIG. 1, the yoke 86 is positioned around the connector middle portion 62 so that the yoke pushing portion 104 is near the socket 84. Holes 108, 118, and 120 are aligned, and linear SMA actuator rods 92 are secured at either end with nuts or other capture means. In the embodiment of FIG. 11, the linear rods 92 connect with extension member 93 to reach between the yoke 86 and distal end 114 of the housing. The attachment of the linear SMA actuator rods 92 between the yoke 86 and housing 88 should position the yoke pushing portion 104 adjacent the socket first end 98 during the locked actuator state.

In the initial state, the linear SMA actuator rods 92 are stretched. The socket 84 is engaged with the connector hex surface 72, and the compression spring 90 is in an initial compressed state. The actuator assembly 20 cannot rotate because connector 28 is constrained by the socket 84 and the direction of rotation is such that pin 116 contact the end of cutout 102. (In FIG. 6, the locking assembly is locked. When unlocked, the connector will rotate downward relative to the orientation of FIG. 6 during rotation of the connector relative to the housing.)

Rod heating elements 94 heat the linear SMA actuator rods 92, that shorten and cause the yoke 86 to move the socket 84 off the hex surface 72 and the spring 90 to compress further. The force of the actuator rods 92 is greater than the compressive force of the spring 90. In moving off the hex surface, the socket 84 frees connector 28 to rotate. In addition, the guide pins 116 move along the longitudinal cutouts 105 of the socket, restraining socket rotation. The actuator assembly is free to rotate. If a connector pin 107 is used, it will be bounded by the arcuate cutout 103. When the linear SMA actuator rods 92 cool, the compression force of the spring 90 forces the socket 84 back onto the connector hex surface. Yoke 86 moves back to its initial position and stretches the linear SMA actuator rods 92.

Various alternative arrangements are possible. For example, mating splines or gear teeth may be used in lieu of a connector hex surface 72 and a 12-point socket. Using splines provides the opportunity for a greater angle resolution.

FIGS. 14A and 14B illustrate an alternative locking assembly. Instead of a yoke 86 and socket 84, a single collar 117 includes side extensions 119, 121 to which the SMA actuator rods 92 are attached. Instead of mating hex surfaces, mating bands of gear teeth 123, 125 located between an interior circular surface of the collar and an outer circular surface of the connector align the elements. A retaining ring or shoulder 127 is preferably positioned around and attached to the connector at the connector gear teeth 125 to serve as a stop for the collar 117. The connector 28 could include the stop or shoulder adjacent the connector gear teeth band 125.

Instead of a single compression spring 90 disposed between the socket 84 and the housing at location 124, two smaller compression springs 90' are provided and are positioned along the SMA actuator rods 92. The housing proximal end longitudinal holes 118' are shortened in length and exposed slots 127 are formed in their place. One compression spring 90' is positioned within one slot 127, and one actuator rod 92 is inserted through the housing hole 118', through the small compression spring 90', and into a corresponding hole 135 in the collar side extensions. The rod is secured therein with a nut 129. The other rod, spring, slot, hole, and nut are arranged similarly.

The collar side extensions 119, 121 each include an open notch 131, 133. The housing proximal end includes a pair of longitudinal arms 137, 139. The housing proximal end 112 inner diameter is sized to closely fit the outer diameter of the collar 127. During use, the collar 127 is position within the housing proximal end, with the housing arms 137 139 contacting the collar notches 131, 133. This ensures that the collar will not rotate relative to the housing, since the notches and arms push against each other. This arrangement of collar notches and housing arms serves the same purpose accomplished by the pin 116 and longitudinal slot 105 of the arrangement shown in FIG. 6.

The alternative locking assembly operates as follows. In the initial state, the linear SMA actuator rods 92 are deformed by being stretched in length. The collar gear teeth 123 are engaged with the connector gear teeth 125, and the small compression springs 90" are in an initial compressed state. The actuator assembly 20 cannot rotate due to the connector being constrained by the collar teeth and due to both the connection of the collar to the housing via the SMA actuator rods 92 and the direction of rotation being such that the collar notches push against the housing arms 137, 139. (In FIG. 14B, the locking assembly is locked.)

Rod heating elements 94 heat the linear SMA actuator rods 92 become which shorten and cause the collar 117 to move further into the housing 88, freeing and the collar teeth 123 to move off the connector teeth 125. The springs 90' compress further, since the linear force of the SMA actuator rods 92 exceeds the compressive force of the springs 90'. In moving off the teeth, the collar frees the connector 28 to rotate. The housing side arms engage the collar notches to restrain collar rotation. The actuator assembly is free to rotate. When the linear SMA actuator rods 92 cool, the compression force of the springs 90 forces the collar teeth 123 back onto the connector teeth 125. The martensitic actuator rods 92 stretch.

FIGS. 15A and 15B illustrate another embodiment of a locking assembly. The second embodiment locking assembly 140 includes a brake cylinder 142, a brake housing 144, a pair of shape memory alloy cylinders 145, 146, a short connector 148, a shaft 150, and heating elements 152.

Referring to FIGS. 15A and 15B, the housing 144 is rectangularly shaped and includes a front surface 154; an opposed back surfaces (not shown); a through-hole 156 extending through the housing crosswise to the front and back surfaces; first and second end surfaces 158, 160; a circular longitudinal hole 162 extending through the housing crosswise to the first and second end surfaces; first and second side surfaces 164, 166; and an H-shaped passage 168 extending through the housing crosswise to the first and second side surfaces 164, 166. The housing portions defined by the H-shaped passage and the through-hole form first opposed platforms 170, 170' and second opposed platforms 172, 172'. The through-hole 156 further defines first and second inner faces 174, 176 that are located parallel to the first and second end surfaces 158, 160, respectively. The housing 144 is preferably formed from a high strength steel alloy capable of withstanding repeated stretch cycles.

Still referring to FIGS. 15A and 15B, the cylinder 142 length is greater than the distance between the inner first and second opposed inner faces 174, 176 when the housing is in an unstretched (i.e., undeformed) state. The shaft 150 exceeds the distance between the housing end surfaces 158, 160. The shaft 150 includes a first end 180 adapted to connect to the return spring 26 via the short connector 148 and a second end 182 adapted to connect to the object 66 to be rotated. The pair of SMA cylinders 146, 146' are trained in compression. Therefore, in an austenitic state, the SMA cylinders will lengthen to their memory size.

To assemble locking assembly 140, opposed inner faces 174, 176 of the housing are stretched apart and the brake cylinder 142 is inserted into the housing through-hole 156 until the cylinder aligns with the housing longitudinal hole 162. The housing faces are released and the shaft 150 is inserted into the housing longitudinal hole 162 and the cylinder 142. The shaft 150 is held with pins 184. The shaft 180 is connected to the return spring 26 via the connector 148, and the brake housing 140 is connected to the housing 88 through two screws 186, 186' that interconnect between the housing proximal end 112 and corresponding screw holes 188, 188' in the housing.

The assembled brake housing 144 is under tension, being stretched by the inserted cylinder. A significant frictional force is applied between the cylinder end surfaces and the housing's inner faces 174, 176. Because the shaft 150 is connected to the cylinder 142 and the cylinder is frictionally restrained from rotating, the shaft 150 and the return spring 26 are also restrained from rotating.

Activating the heating elements 152, 152' heats the pair of SMA cylinders 146, 146', causing them to elongate and push the opposed platforms 170, 170' and 172, 172' apart, which releases their frictional contact with the cylinder ends. The shaft 150 is thereby free to rotate with the return spring 62 when the SMA torque tube 24 is heated.

The locking assembly is usually engaged, thereby preventing actuator rotation in its passive or rest condition. Upon application of heat to the linear SMA actuator rods 92 or the SMA cylinders 146, 146' and their transition into the austenitic state, however, the lock is released and the actuator assembly is activated to provide torque.

A rotary actuator of the type described can provide a significant amount of torque in one direction of rotation or both directions, if desired. If only one direction of torque is required, then the heat to the SMA torque tube may be discontinued and the return spring may be used to zero the actuator. If it is desired to still provide some resistance during the return path, the SMA torque tube may be heated according to a schedule that produces the desired resistance. If torque is required in both directions of rotation, the return spring may be increased in strength and heat may be varied appropriately.

The preferred rotary actuator generates high mechanical rotational force, can be locked into multiple positions without continuous use of electrical power, and automatically returns to the neutral position when the lock disengages.

The benefits of the actuator of the present invention are particularly advantageous when applied to rotocraft blades. FIG. 16A shows a rotary actuator used to twist a rotocraft blade 200 (shown in phantom) about a longitudinal axis. Traditionally, the blade includes a longitudinal twist profile that is of a fixed geometry, determined as a compromise between the blade position desired for optimal hover performance and the blade position desired for optimal cruise performance. Many systems use an actuator to twist the blade by nearly the full amount rotated by the actuator. For example, a 12 degree actuator rotation would produce about a 12 degree wing tip rotation. These systems require a heavy, stiff, torque tube having only minimal torsional distortion properties. Heavy torque tubes are impractical for rotocraft blade applications.

Our preferred SMA rotary actuator 18 provides sufficiently high angle output and high torque output to allow the use of a torsionally flexible passive torque tube that is lightweight compared with stiff torque tubes. Instead of a one-to-one correlation between the actuator rotation angle and the blade tip rotation angle, our actuator rotates much more than is necessary at the blade tip and produces the desired blade tip rotation. Further, the present invention actuator is sufficiently small to fit into thin rotocraft blades.

Referring to FIG. 16A, the blade includes a blade root 202 connected to a conventional hub (not shown) and a blade tip 204. The blade comprises a structural spar 205 extending longitudinally and a surrounding aerodynamically-shaped structure 207. Referring to FIG. 16B, the cross-sectional shape of the spar is generally rectangular. The cross-sectional shape of the skins is of a cambered airfoil. Other shapes may be used. A rotary actuator 18 is attached within the spar near the blade root. Shown in FIG. 16A, the rotary actuator housing distal end is connected to helicopter blade root structure using a blade connection mechanism 212. Referring to FIG. 16B, the rotary actuator housing distal end is shaped to mate with the inner spar surface to further reducing the possibility of rotary motion between the housing and the spar.

A passive torque tube 206 is positioned within the blade spar and includes a distal end 205 connected to the blade tip 204 via a tip connection mechanism 208. The passive torque tube 206 further includes a proximal end 207 connected to the rotary actuator 18. The rotary actuator 18 shown in FIG. 16A is the embodiment described above with reference to FIG. 1. Therefore, the passive torque tube proximal end 207 is connected to the actuator connector second end 60. Various support components 210 are optionally provided and located along the distance of the passive torque tube 206 within the spar.

During use, the angular output of the rotary actuator 18 is much greater than the angle needed at the blade tip. The passive torque tube proximal end 207 follows the actuator output. The connection of the passive torque tube 206 at the blade tip provides a counter-acting rotational torque at the tube's distal end 205. The result is a twist rotation of the spar such that the resulting blade tip rotation angle is of the desired amount. The passive torque tube 206 is preferably sized and formed according to the angular twist requirements of the blade, the stiffness of the spar and surrounding structure, and the angular twist capability of the actuator.

In one preferred embodiment, rotation of the rotary actuator by about 50 degrees causes rotation of the passive torque tube by about 42 degrees and rotation of the blade by about 8 degrees. Preferred maximum rotary actuator rotations are in the range of about 30°–60°. Preferred passive torque tube maximum rotations (as measured end-to-end) are in the range of about 18°–54°. Preferred maximum longitudinal blade tip rotations are in the range of about 6°–12.

The rotary actuator allows the helicopter blade twist angle to be changed between cruise and hover operating conditions, significantly improving helicopter performance. This blade twist system minimizes system weight and minimally impacts rotocraft blade torsion stiffness.

A preferred actuator of the present invention possesses nearly the energy density of a traditional hydraulic actuator, but it is electrically controllable. The actuator competes with hydraulics in applications requiring slow to modest switching, although thermoelectric devices 171 (FIG. 17 and 18) improve the switching rate by controlling the total heat involved with operation of the actuator. The thermoelectric devices function much like heat pipes to contain heat within the vicinity where it is beneficial to switch the SMA materials. The drawbacks associated with resistance heating of the SMA or other heating designs are largely avoided. Many applications for the actuator are possible. In the aerospace area, control surface actuation is obvious, including thrust vector control. Single event applications, like speed brakes, might also be possible. Actuation of landing gear, especially in cold weather or at high altitude, is another possible application. In industrial areas, the devices are suitable for lifting, positioning, holding, or moving objects, especially in cold temperatures where hydraulics have problems. A myriad of applications for automobiles and farm equipment that use hydraulic systems today could be converted to electrical actuation.

One way to cool the SMA in our actuators efficiently is to use thermoelectric devices 171. Instead of relying upon heat flow (a temperature gradient between materials or areas), however, to generate a voltage in a thermocouple mode for the thermoelectric devices, we supply power to the device(s) 171 to cause heat to flow from one side of the device to the other side. The efficiency (i.e., the Coefficient of Performance or COP) of a thermoelectric device can be roughly categorized by the heat flow divided by the input power. Where large thermal gradients naturally exist, little additional electric power need be supplied to a thermoelectric device to maintain it in the cooling mode, as is understood with the Seebeck effect.

Advanced thermoelectric devices and their performance including discussion of the Peltier effect and Seebeck effect is provide in U.S. patent application Ser. No. 08/972,636, which we incorporate by reference. Thermoelectric devices suitable for use in the present application are commercially available from MELCOR (Materials Electronic Products Corp.) and other sources. Devices providing high COP are preferred.

Ferromagnetic SMA, if achieved will provide large, free strain when compared with the similar piezo, electrostrictive and magnetostrictive materials. Currently, 4.5% field switched ferromagnetic material has been demonstrated, and 0.5% reversible strain has similarly been shown. Nevertheless, much work remains between the current compositional (alloy formulation) studies on small laboratory samples of material and implementation of these ferromagnetic SMA materials in practical applications. Such development work includes identifying the magnetic field levels necessary to energize these materials. Ten percent (10%) reversible strain materials are thought possible. The robustness of SMA materials, their high potential energy density, rapid development, and the like justify continuing this research. The University of Washington research concentrates on field induced martensitic transformation and development of materials where the Curie temp is close to the martensitic transformation temperature. Such alloys would require temperature control in the system, but would allow rapid actuation of cyclic operation if the internal material losses are small. Others are researching twin boundary motion (similar to a thermomechanical SMA) to allow operating over a large temperature range. There are a wide variety of materials being investigated, but currently the NiMnGa and Fe (Ni,Pd Co,Ti) alloys are receiving significant effort.

A major challenge for the blade twist application is to package the actuator within the ½" thick blade, particularly if a lock is included in the actuator package. Our preferred actuator consists of a NiTinol torque tube, a superelastic return spring, and a NiTinol actuated lock. This actuator provides 120 in-lb output but weighs only 0.29 pounds. The NiTinol torque tube is only a small part (17%) of this weight.

The survival temperature requirements for helicopters usually dictate use of a high temperature SMA material to avoid inadvertent actuation. One of the key requirements is to meet the response and simultaneous actuation requirement to keep the blades from excessive vibration. While a CH-47 blade is considerably more slender than a V-22 blade, its actuation torque requirements are higher because of the tip softness on the V-22 blade.

In our preferred actuator, the actuation torque is developed by a thin wall binary NiTinol tube. It is important to minimize the amount of NiTinol and thus decrease its thermal response time. The large (60°) rotation can be developed by a few inches of NiTinol within its load/strain capabilities. The superelastic NiTinol return spring provides a positive return load to guarantee the blade returns to its untwisted condition. The key challenges in developing the actuator were in load/packaging, thermal response, developing NiTinol fabrication techniques, NiTinol creep, and linear controllability. Successful tubes have been tested for over 12,000 cycles, but we are still striving to achieve lighter designs by reducing the wall thickness of the tubes while still achieving the desired loads. The thermal response improves as less SMA material is used in each tube.

The lock allows unpowering the actuator when the rotocraft is in its cruise mode. The lock, however, adds considerable complexity. Positive engagement designs (i.e., locks) allow limited angular resolution while other designs (i.e., brakes) permit infinite resolution by relying on friction. The preferred lock uses a multi-tooth load sharing spline (FIG. 14A) to allow packaging within the blade.

For control, we use an angular transducer (potentiometer of Hall effect device) and PID control electronics with a PWM drive amplifier. By using large integral gains, we have been able to deal with NiTinol hysteresis. Linear control has been routinely demonstrated before with antagonistic SMA elements, but here the small superelastic rod provides this return torque.

Even more challenging is the control of the integrated actuator and lock. The tube can be rotationally positioned as above, but the additional issue was engaging and disengaging the fine tooth spline under load. With the lock disengaged, the tube was rotated to the desired angle under load. The electronics stored the tube temperature required at the given load & angle, and then engaged the NiTinol actuated spline lock (the actuator is unpowered during forward flight). To disengage the lock and retwist the blade (i.e., upon landing), the torque tube is heated to the appropriate temperature to carry the load, and the lock disengaged. Having the torque tube carry the load minimizes binding on the spline lock during disengagement by the linear NiTinol actuation rods.

FIGS. 17 & 18 show an alternative actuator concept 111 using thermoelectric devices (TECs) 171 for thermal control with two torque tubes to actuate a blade ±4° (vs the previous 0–8°). The two, opposing NiTinol torque tubes 173 and 175 are coupled together in an antagonistic function (i.e., by gearing 177, as shown). Each tube needs to supply only half the previously quoted torque. If one or more a TECs are used to control the heat flow between the tubes, the heat from the hotter tube can be passed directly to the cooler tube to cause it to generate the torque of the opposite polarity. This antagonistic torque tube design allows greatly reduced thermal response times, even to the point of achieving the same response times in the full scale actuator as in the ⅙ scale model. Two additional TECs 179 are used to pass waste heat from each torque tube to the blade for overall thermal control. Parametric studies show that about 8 times as much heat can be passed between the tubes in this design with TEC 171 as needs to be dumped to the blade with TECs 179. This design also opens new possibilities of avoiding the complexity of the lock by maintaining the temperature of the actuator, since the actuator is more thermally isolated from the blade.

Rapid heat flow between the SMA materials allows higher response speeds, reduces power requirements for the system, and reduces weight. The additional TECs connect the actuator to the load for long-term thermal control. Electrical heaters might also be used with each tube to provide better overall thermal control and to enhance speed further.

Antagonistic tubes 173 and 175 in opposition enhances the overall efficiency. In an alternative embodiment, however, the second active SMA tube can be replaced with a passive thermal sink and return spring, as we have described for the embodiments where TECs are not included. Without the TECs, low speeds of about 0.1 Hz or less are required because the SMAs cool slowly without active heat transfer.

In slightly different terminology, FIG. 18 shows an actuator having first and second opposed torque tubes 173 and 175 formed from shape memory alloy, like NiTinol. The torque tubes 173 and 175 are connected to a load sharing gear 177 and an output load, such as a helicopter rotor. Each tube 173 or 175 is fixed at one end to or meshes with the gear 177 while the other end is free. The tubes are trained in opposition to one another, one rotates clockwise and the other counterclockwise when activated by heating to change memory states. As described at page 16 for the rods 92 in FIGS. 10 and 11, the torque tubes 173 and 175 transition from martensitic to austenitic when heated.

FIG. 18 also shows thermoelectric coolers (TEC) 171 and 179 thermally connected to at least one of the tubes 173 or 175. In particular, TEC 171 is capable of heating one tube while cooling the other. Depending on the polarity of current supplied to TEC 171 heat is transferred leg tube 173 leg tube 175, or vice versa. Upon heating and cooling the tubes oscillate between their trained shapes as the shape memory alloy changes between the martensitic and austenitic states.

The same alternate description could be applied to the device in FIG. 14 where spring 90 is in contact with collar 117.

The present invention and our SMAC program are described in greater detail in the paper: "Shape Memory Alloy Consortium" by A. Dean Jacot presented Mar. 1, 1999, at the SPIE Smart Structures and Materials Conference. Additional details concerning the invention and its operation are included in the papers: A. Dean Jacot et al., "Shape memory Alloy Consortium and Demonstration," SPIE, March, 2000 and D. Clingman et al., "Shape Memory Alloy Consortium and Demonstration," AIAA-2000-1790, March, 2000. We incorporate these papers by reference.

While we have described preferred embodiments, those skilled in the art will readily recognize alterations, variations, and modifications that might be made without departing form the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. An actuator for cycling between first and second positions, comprising:
   first and second shape memory alloy (SMA) material elements trained to shapes in opposition to one another in their respective austentite phases;
   at least one heating/cooling device thermally connected to at least one element, each heating/cooling device being capable of simultaneously heating one SMA element while cooling the other; and
   a locking assembly associated with at least one SMA element.

2. An actuator according to claim 1, wherein each heating/cooling device includes at least one thermoelectric element.

3. An actuator according to claim 1, wherein each heating/cooling has at least two modes of operation, in a first mode, heating the first element while cooling the second element and, in a second mode, cooling the first element while heating the second element.

4. An actuator for cycling between first and second positions, comprising:
   a first shape memory alloy (SMA) device trained in its austenite phase in the first position;
   a second shape memory alloy (SMA) device trained in its austenite phase in the second position, the SMA devices being coupled together in antagonistic relationship; and,
   at least one thermoelectric element thermally connected to both SMA devices wherein upon application of current in a first direction through the thermoelectric element, the element heating the first SMA device and cooling the second SMA device to return the first SMA device to the first position while deforming the second, coupled SMA device,
   while upon application of current in an opposite direction through the thermoelectric element causes cooling first SMA device and heating the second SMA device.

5. A method of manufacturing an actuator for cycling between first and second positions, comprising the steps of:
   training a first shape memory alloy (SMA) device in its austenite phase in the first position;
   training a second shape memory alloy (SMA) device in its austenite phase in the second position, the SMA devices being trained to shapes in opposition to one another, each SMA device having a respective transition temperature;
   disposing at least one thermoelectric element in thermal connection with at least the first SMA device; and
   heating the first SMA device to its transition temperature with the thermoelectric element to cause that SMA device to transition between the first position and the second position.

6. A method of cycling a shape memory alloy (SMA) actuator between first and second positions, said actuator having first and second SMA devices and at least one thermoelectric element disposed in thermal connection with at least one of the SMA devices, comprising the steps of:
   applying current to the thermoelectric element to heat the first SMA device while cooling the second SMA device, and;
   switching the current direction to heat the second SMA device while cooling the first SMA device.

7. An actuator for cycling between first and second positions, comprising:
   at least two elements formed from shape memory alloy (SMA) material and coupled together for antagonistic action;
   at least one heating/cooling device thermally connected to at least one of the SMA elements and being capable of simultaneously heating one SMA element while cooling the other; and
   a locking assembly associated with at least one SMA element.

8. An actuator according to claim 7, wherein each heating/cooling device includes at least one thermoelectric element.

9. An actuator for cycling between first and second positions, comprising:
   an outer tube defining a longitudinal axis;
   an inner tube disposed within the outer tube, both tubes formed from shape memory alloy (SMA) metal, and mechanically coupled together in antagonistic relationship and,
   at least one heating/cooling device disposed in thermal contact with at least one SMA tube and being capable of simultaneously heating one SMA tube while cooling the other.

10. An actuator according to claim 9, wherein each heating/cooling device includes at least one thermoelectric element.

11. An actuator according to claim 9, wherein one SMA tube has its austentite state without torsional displacement with respect to the longitudinal axis in the first position while the second SMA tube has its austentite phase without torsional displacement with respect to said longitudinal axis in said second position to achieve the antagonistic mechanical coupling.

12. A rotary actuator for cycling between first and second positions separated by a predetermined number of degrees of rotation, comprising:
   first and second shape memory alloy (SMA) devices cyclable between first and second shapes and mechanically coupled to provide the rotation; and,
   at least one heating/cooling device thermally connected to both SMA devices for simultaneously heating one SMA device while cooling the other.

13. An actuator according to claim 12, wherein the heating/cooling device includes at least one thermoelectric element.

14. The actuator of claim 9 further comprising a locking assembly associated with at least one SMA tube.

15. An actuator for cycling between first and second positions, comprising:
   (a) two shape memory alloy (SMA) devices arranged in antagonistic relationship; and
   (b) at least one thermoelectric device to control heat flow between the SMA devices and to cause switching between SMA states with active heat transfer between a hotter SMA device and a cooler SMA device.

16. The actuator of claim 15 wherein the SMA devices are torque tubes and further comprising at least one waste heat thermoelectric device associated with each tube to pass waste heat to a heat sink for overall thermal control of the actuator.

17. The actuator of claim 16 wherein the tubes are coupled to a rotocraft blade for imparting blade twist.

18. The actuator of claim 17 wherein the blade functions as the heat sink.

* * * * *